Feb. 20, 1962 G. F. LA DUE 3,021,894
CAR TOP PROTECTIVE COVER
Filed April 13, 1959 3 Sheets-Sheet 1
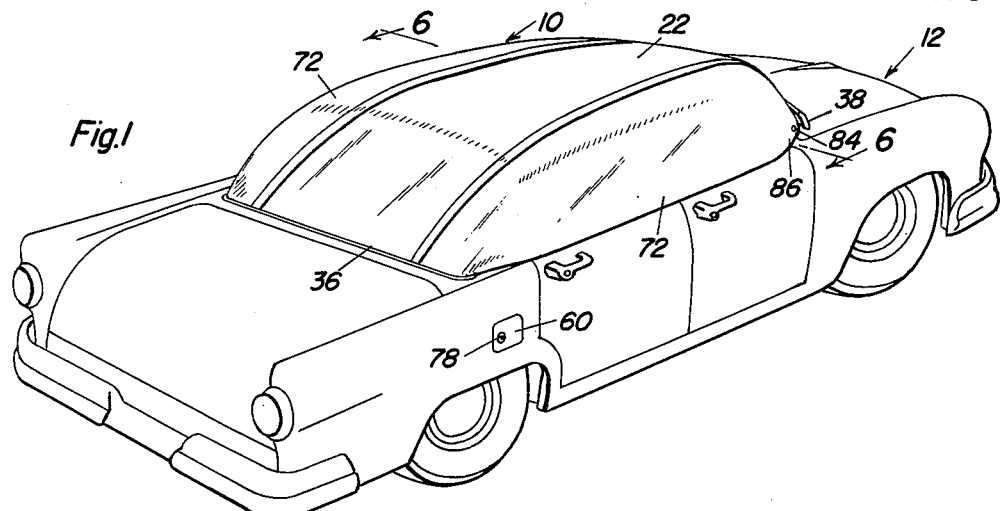
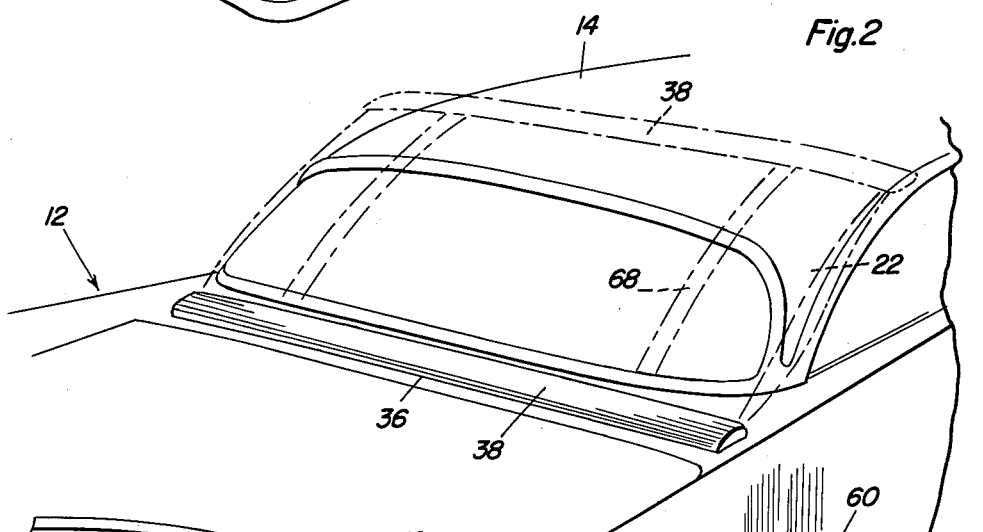
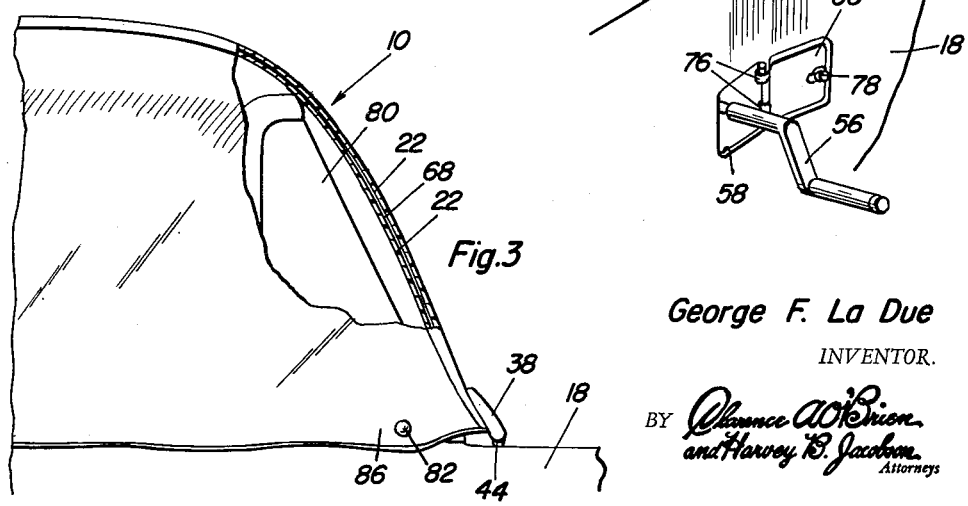
George F. La Due
INVENTOR.

Feb. 20, 1962   G. F. LA DUE   3,021,894
CAR TOP PROTECTIVE COVER
Filed April 13, 1959   3 Sheets-Sheet 2
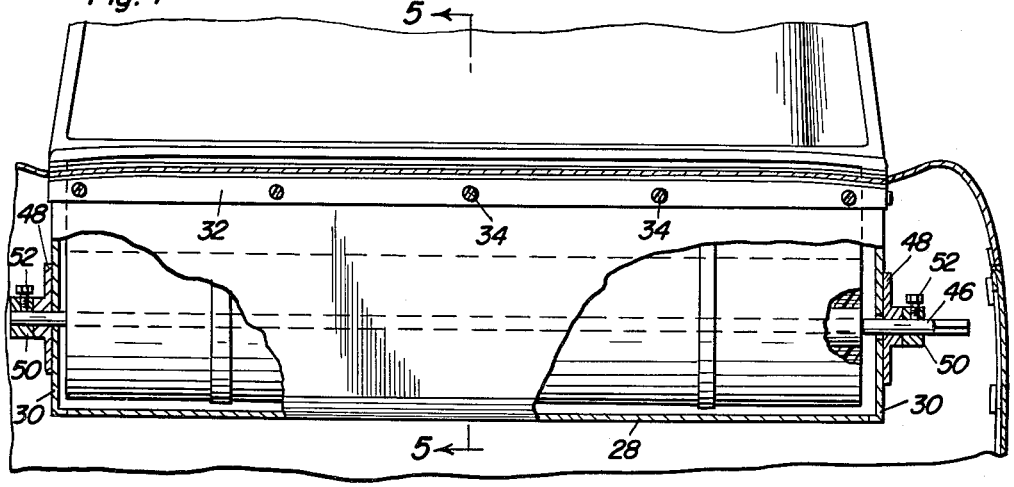
Fig. 4
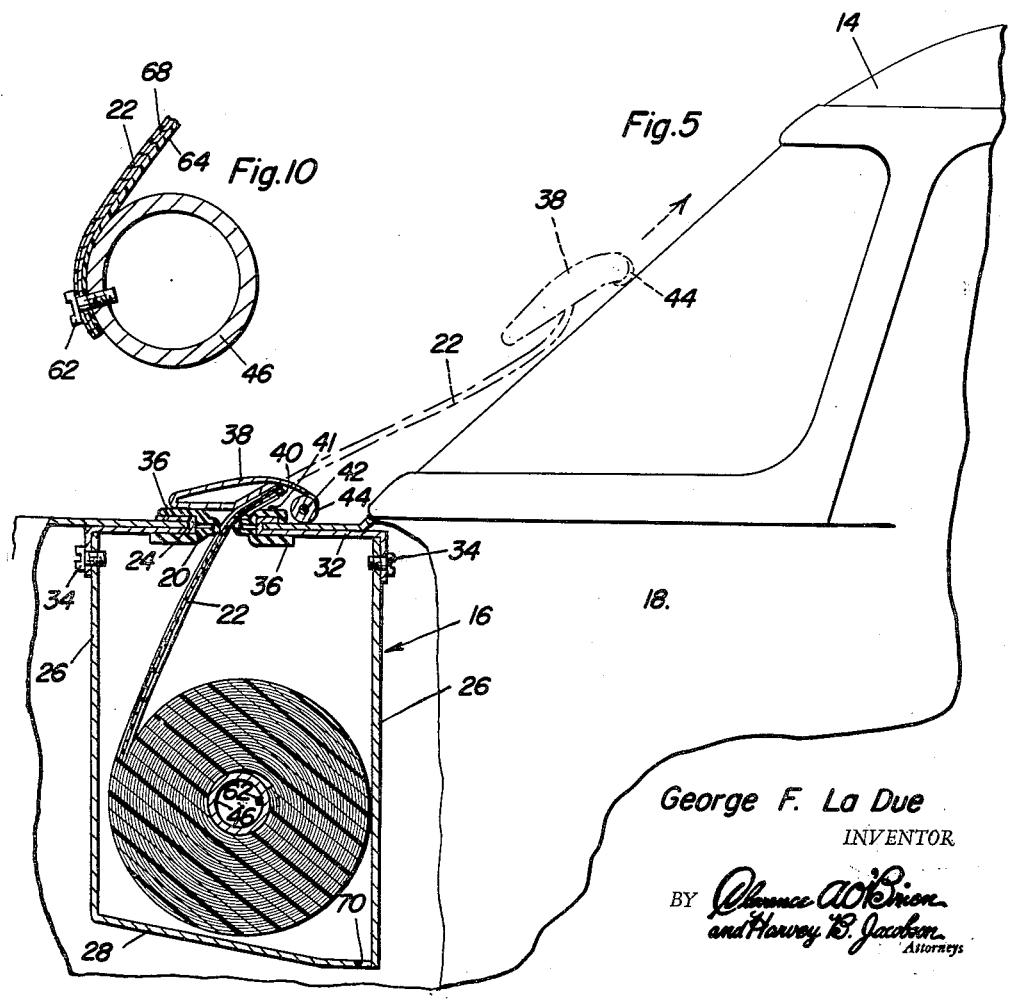
Fig. 10
Fig. 5
George F. La Due
INVENTOR Feb. 20, 1962 — G. F. LA DUE — 3,021,894
CAR TOP PROTECTIVE COVER
Filed April 13, 1959 — 3 Sheets-Sheet 3
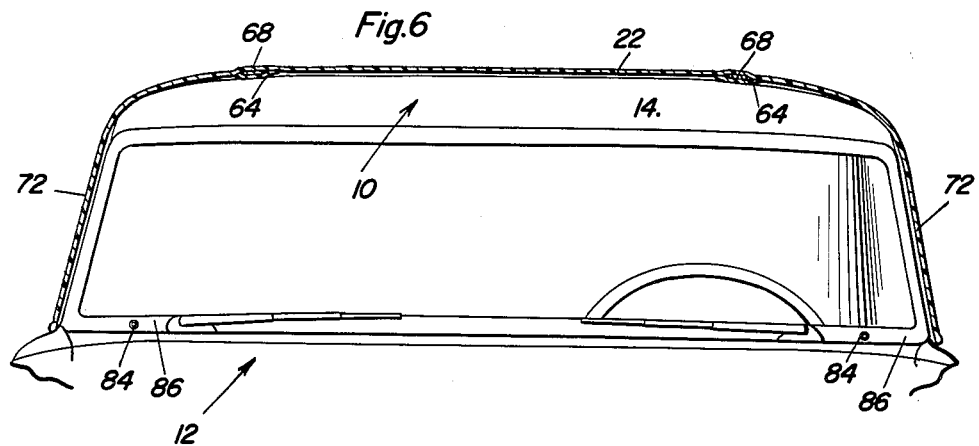
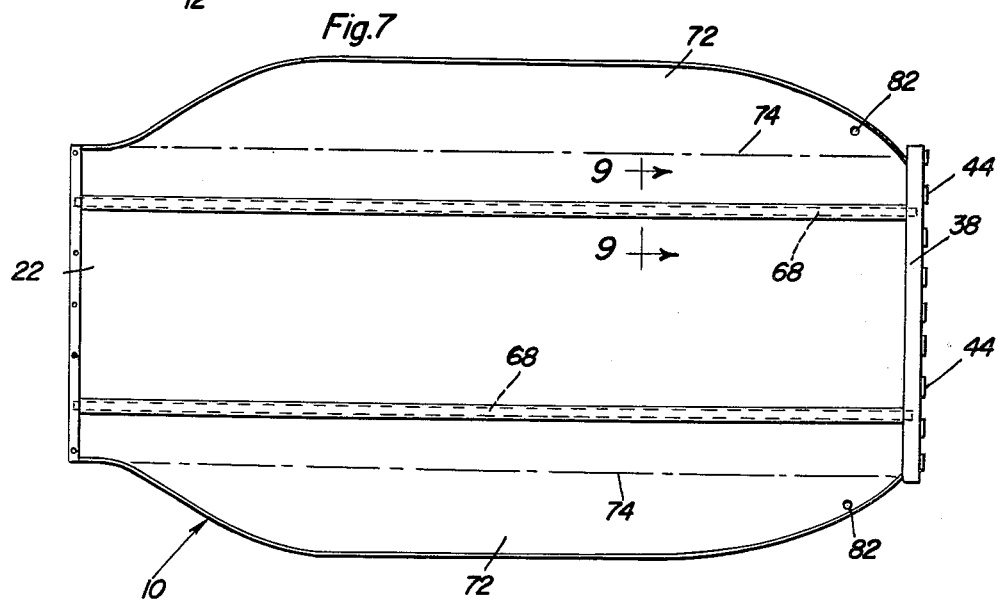
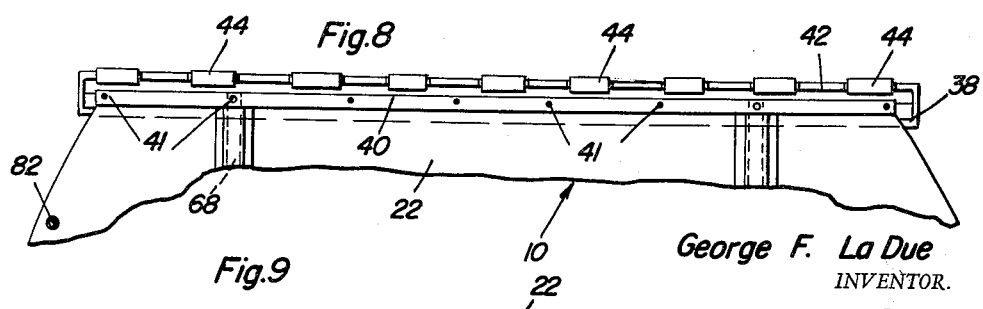
George F. La Due
INVENTOR.

United States Patent Office 3,021,894
Patented Feb. 20, 1962

3,021,894
CAR TOP PROTECTIVE COVER
George F. La Due, River St., Milton, Vt.
Filed Apr. 13, 1959, Ser. No. 805,866
3 Claims. (Cl. 160—23)

This invention relates to a car top protective cover and more particularly to a car top protective cover designed to be stored in a coiled state about a shaft journalled in a housing that is adapted to be carried by a vehicle.

In many instances the owner of a vehicle would like to be able to place a cover over his vehicle so that it will be protected from the elements and other factors that are detrimental to paint or metal finishes such as tree sap and bird droppings. Although there are many forms of protective structures under which a vehicle may be placed such as parking buildings and garages, these are not always available, thereby frequently forcing a vehicle owner to leave his vehicle in an unprotected state where various detrimental forces are apt to cause damage in one way or another.

It is therefore the main object of this invention to provide a protective covering for a vehicle that may be conveniently stored therein and be ready for instant use.

A further object of this invention is to provide a protective cover that may be conveniently manipulated to an operational position by a person being quite unfamiliar with the actual construction of the protective cover.

A still further object is to provide a protective covering having a housing therefor that may be carried by a vehicle in a concealed or unobtrusive manner.

Still another object of this invention is to provide a protective cover that will partially cover the sides of the vehicle as well as the entire top portion thereof.

Yet another object of this invention is to provide a protective covering that may be stored in a coiled or rolled fashion about a roller and may be retracted from or extended to an operational position merely by effecting rotation of the roller.

Still a further object of this invention, in accordance with the preceding object, is to provide a protective covering having a plurality of flexible stiffeners extending longitudinally the entire length thereof.

Another object of this invention is to provide a protective covering having a retaining and molding strip extending transversely across the extendable end thereof with at least one fastener thereon adapted to engage a part of the vehicle to retain the cover in an extended position.

A final object to be specifically enumerated therein is to provide a protective covering that will lend itself to conventional forms of manufacture and be of simple construction whereby it can be economically manufactured and readily adapted to existing vehicles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the invention shown in an extended position over the top portion of a vehicle;

FIGURE 2 is an enlarged fragmentary perspective view of the vehicle with the cover being shown in the retracted position, the retaining molding being shown adjacent the lower portion of the rear window of the vehicle, and the operating crank being shown extended through an opening in the side of the vehicle, a partially extended portion of the cover being shown in phantom lines;

FIGURE 3 is an enlarged fragmentary side elevational view of the front portion of the top of the vehicle with the protective covering shown in an extended position thereover, parts of the protective covering being broken away and shown in section;

FIGURE 4 is a fragmentary vertical transverse sectional view, parts being shown in elevation and taken substantially along the longitudinal center line of the shaft about which the protective covering is wound;

FIGURE 5 is a fragmentary longitudinal vertical sectional view of the housing containing the protective covering taken substantially upon the plane indicated by the section line 5—5 of FIGURE 4, parts of the vehicle being shown in elevation;

FIGURE 6 is an enlarged transverse vertical sectional view of the vehicle taken substantially upon the plane indicated by the section line 6—6 of FIGURE 1, the flexible cover being shown over the top portion of the vehicle and in section;

FIGURE 7 is a top plan view of the protective covering, the fold lines of the side portions thereof being shown in chain lines;

FIGURE 8 is an enlarged bottom plan view of the extended end of the protective covering showing the retaining molding and the spaced rollers journalled thereon;

FIGURE 9 is a transverse vertical sectional view of the top covering taken substantially upon the section line 9—9 of FIGURE 7 showing the manner in which the flexible stiffeners are secured thereto; and FIGURE 10 is an enlarged vertical transverse sectional view of the roller showing the manner in which the top covering is secured thereto, parts of the covering being broken away.

Referring now more specifically to the drawings the numeral 10 generally designates the cover assembly comprising the present invention which is adapted to be carried by a vehicle generally referred to by the reference numeral 12 and entrained over the top portion 14 thereof.

With reference to FIGURE 5 it will be seen that a housing 16 is mounted within the body 18 of the vehicle 12, and that it has extending along one side thereof a longitudinal slot 20 through which the extended portion of the flexible cover fabric 22 projects. The slot 20 is in registry with a transversely extending opening 24 formed in the body 18. Housing 16 is in the form of an open top elongated box-like structure, having side walls 26, a bottom wall 28 and a pair of end walls 30. The housing 16 has a top wall 32 which is removably secured thereto by means of any suitable fasteners 34, the top wall 32 being secured to the body 18 by having portions thereof, on opposite sides of the slot 20, struck upward and backward in overlying relation to the portions of the body 18 adjacent the opening 24 therein providing an overlapping joint between the body 18 and the housing 16. A pair of elongated molding strips are provided and overlap the lapped joint between the top wall 32 and the portions of the body 18 adjacent the slot 20. The molding strip 36 may be constructed of any convenient material such as hard rubber or the like so as to provide a suitable seat for the transversely extending retaining and molding strip 38 which is secured to the extendable end of the flexible cover fabric 22.

The extendable end of the cover fabric 22 is sandwiched between the molding strip 38 and the strip element 40, the latter being secured to the under surface of the molding strip 38 by any convenient means such as fasteners 41 and it is to be understood that the retaining and molding strip 38 may be of any desirable shape so as to provide a pleasing appearance when the latter is positioned adjacent the slot 20 with the cover fabric 22 in the retracted position as shown in FIGURE 5.

Further, it is to be understood that the retaining and molding strip 38 completely overlies and extends beyond both the ends and the side edges of the slot 20 so as to provide a partial weather-tight seal for slot 20 in the housing 16.

Mounted within the retaining and molding strip 38 by any convenient means, see also FIGURE 8, is a longitudinally extending axle pin 42 on which are rotatably mounted a plurality of rollers 44 which are adapted to engage the top 14 of the vehicle as the cover assembly 10 is slidingly moved into a position thereover.

Journalled within the housing 16 and extending longitudinally thereof is a shaft 46 whose opposite end portions extend through the end walls 30. Carried by each of the end walls 30 is a bearing 48 through which the ends of the shaft 46 extend. The shaft 46 is retained in longitudinally adjusted position within the housing 16 by means of a pair of collars 50 which are secured to the shaft 46 outwardly of the bearings 48 by means of set-screws 52.

As can best be seen in FIGURES 2 and 4, one end of the shaft 46 has a hexagonal extension 54 thereon that is adapted to be engaged by a crank handle 56 which is inserted through access opening 58 formed in the adjacent portion of the body 18 having a suitable closure 60 therefor.

Although the crank handle 56 has been shown in the drawings to effect the rotation of the shaft 46, it is to be understood that any convenient motor means may be operatively connected to the shaft 46 to effect the rotation thereof. Such motor means (not shown) have a suitable control (not shown) therefor.

The cover fabric is secured to the shaft 46 by any convenient means such as fasteners 62 and is provided with at least one pair of longitudinally extending flexible strips 64, see FIGURES 6, 7 and 9, preferably of the same material as the cover fabric 22, that are secured to the cover fabric 22 by any convenient means along the longitudinal side edges thereof such as by stitching. The space or pocket provided between the flexible strips 64 and the cover fabric 22 is adapted to slidingly receive flexible stiffeners 68. The flexible stiffeners 68 extend from the retaining and molding strip 38 along the undersurface of the cover fabric 22 to the shaft 46 to which they are secured along with the cover fabric 22.

With attention now drawn more particularly to FIGURE 5, it will be noted that there is provided a drain opening 70 in the bottom wall 28 adjacent one of the side walls 26 towards which the bottom wall 28 is downwardly inclined.

With attention now drawn to FIGURE 7, it will be noted that the cover fabric 22 is substantially rectangular in shape but that it has a pair of projecting side flaps 72 which are defined by the chain or fold lines 74.

With attention drawn to FIGURE 2 of the drawings, it will be noted that the closure 60 is suitably hinged to the body 18 as at 76 and that a lock 78 is provided to insure that the cover assembly will not be operated by any unauthorized person.

In operation, when it is desired to raise the cover assembly 10, the closure 60 may be unlocked and opened, and the crank handle engaged upon the hexagonal extension 54 of the shaft 46. The crank 56 is then rotated in a clockwise direction whereupon the flexible stiffeners 68 will urge the extensible end of the flexible cover fabric 22 outwardly through the slot 20. As can best be seen by the phantom lines in FIGURE 5 of the drawings, the retaining and molding strip 38 is guided up over the top portion 14 of the vehicle 12 with the rollers 44 engaging the top 14 of the vehicle 12. The rotation of the crank in the clockwise direction is continued until the retaining and molding strip 38 is adjacent the forward and lower end of the windshield 80 of the vehicle 12 as best seen in FIGURE 3. Fasteners 82 are carried by the retaining and molding strip 38 and are adapted to engage the retaining elements 84 provided on the windshield molding 86 to retain the cover fabric 22 in position over the top 14. The side flaps 72 having been folded back over the center portion of the cover 22 may then be unfolded to cover the side portions of the top 14.

When it is desired to store the cover assembly 10, the procedure is reversed; the fasteners 82 are disengaged and the side flaps 72 are folded back over the center portion of the cover fabric 22. The crank handle 56 may then be engaged with the hexagonal extension 54 on the end of the shaft 46 to rotate the shaft 46 in a counter-clockwise direction reeling the cover fabric 22 within the housing 16 about the shaft 46.

It is to be understood although the drawings show the protective cover assembly 10 used to cover only the top portion 14 of a vehicle 12, that the assembly 10 could be used to cover substantially the whole vehicle the housing 16 then being mounted adjacent either the front or rear end of the vehicle 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cover assembly for a vehicle body, said assembly comprising an elongated housing adapted to be carried by said body and to extend transversely thereof rearwardly of the top of said body, said housing having a longitudinal slot formed in one side thereof, a shaft journaled longitudinally in said housing, a flexible extendable cover having one end mounted on said shaft, said cover having a center longitudinally extending section and a pair of opposite side flaps spaced slightly from said one end of said covering and adapted to at least partially cover the sides of the top of the vehicle over which said center section extends and to be folded back over opposite side portions of said center section prior to the latter being wound about said shaft, said center section including a pair of opposite side longitudinally extending flexible stiffeners secured thereto, extending the entire length thereof and secured at said one end of said cover to said shaft whereby said cover may be extended over a vehicle body or rolled into a storage position wound about said shaft upon rotation of the latter, said center section having a width slightly less than the length of said slot, a transversely extending retaining and molding strip secured to the other end of said covering comprising a closure for said slot and including a plurality of rollers journaled thereon at points spaced longitudinally therealong about an axis extending longitudinally of said strip adapted to engage a vehicle top over which said cover is being moved to support said strip in a slightly elevated position over said vehicle top.

2. The combination of claim 1 including at least one fastener carried by said other end of said cover adapted for engagement with a portion of said vehicle.

3. The combination of claim 2 wherein said shaft projects from one end of said housing and includes a non-circular projection on the end of the shaft projecting from said housing, a crank handle having a socket on one end complementary to and receiving said projection whereby said crank may be manipulated to effect rotation of said shaft.

References Cited in the file of this patent

UNITED STATES PATENTS

| | | |
|---|---|---|
| 1,197,320 | Whitmore | Sept. 5, 1916 |
| 1,912,231 | Wandscheer | May 30, 1933 |
| 1,918,423 | Persinger | July 18, 1933 |
| 2,213,601 | White | Sept. 3, 1940 |
| 2,773,547 | Voss | Dec. 11, 1956 |